US012648006B2

(12) United States Patent
Yu et al.

(10) Patent No.: US 12,648,006 B2
(45) Date of Patent: Jun. 2, 2026

(54) METHODS AND APPARATUSES FOR SENSING RESOURCE FOR SIDELINK TRANSMISSION

(71) Applicant: Lenovo (Beijing) Limited, Beijing (CN)

(72) Inventors: Xiaodong Yu, Beijing (CN); Haipeng Lei, Beijing (CN); Zhennian Sun, Beijing (CN); Xin Guo, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 407 days.

(21) Appl. No.: 18/268,550

(22) PCT Filed: Dec. 28, 2020

(86) PCT No.: PCT/CN2020/140240
§ 371 (c)(1),
(2) Date: Jun. 20, 2023

(87) PCT Pub. No.: WO2022/140935
PCT Pub. Date: Jul. 7, 2022

(65) Prior Publication Data
US 2024/0314818 A1 Sep. 19, 2024

(51) Int. Cl.
*H04W 72/40* (2023.01)
*H04W 28/06* (2009.01)
*H04W 72/0446* (2023.01)

(52) U.S. Cl.
CPC .......... *H04W 72/40* (2023.01); *H04W 28/06* (2013.01); *H04W 72/0446* (2013.01)

(58) Field of Classification Search
CPC ....... H04W 72/40; H04W 4/40; H04W 28/26; H04W 72/0446
See application file for complete search history.

(56) References Cited

U.S. PATENT DOCUMENTS 11,937,182 B2 * 3/2024 Hosseini .......... H04W 52/0229
2018/0359659 A1 12/2018 Cai et al.
(Continued)

FOREIGN PATENT DOCUMENTS

CN 108024318 A 5/2018
CN 111294942 A 6/2020

OTHER PUBLICATIONS 20967287.2 , "Extended European Search Report", EP Application No. 20967287.2, Aug. 14, 2024, 9 pages.
(Continued)

*Primary Examiner* — Raj Jain
(74) *Attorney, Agent, or Firm* — FIG. 1 Patents

(57) ABSTRACT
Disclosed are methods and apparatuses for performing sensing-based resource selection and sidelink (SL) transmission. One embodiment of the subject application provides a method performed by a user equipment, including determining a resource sensing window size of a resource sensing window after a resource selection triggering event at least according to a packet delay budget (PDB) and/or at least one parameter for performing sensing-based resource selection and SL transmission, and/or dividing the resource sensing window and a resource selection window into a number of pairs of resource sensing sub-window and resource selection sub-window for performing sensing-based resource selection and SL transmission.

20 Claims, 3 Drawing Sheets

(56)  References Cited

U.S. PATENT DOCUMENTS

| 2020/0229171 | A1 | | 7/2020 | Khoryaev et al. | |
| 2020/0351057 | A1 | | 11/2020 | Yeo et al. | |
| 2021/0314821 | A1 | * | 10/2021 | Huang | H04L 12/2869 |
| 2021/0385808 | A1 | * | 12/2021 | Kwak | H04W 28/26 |
| 2022/0110055 | A1 | * | 4/2022 | Hosseini | H04W 52/0229 |
| 2022/0417946 | A1 | * | 12/2022 | Khoryaev | H04W 4/46 |
| 2023/0239732 | A1 | * | 7/2023 | Yoshioka | H04W 72/25 |
| 2023/0309065 | A1 | * | 9/2023 | Leon Calvo | H04W 72/563 |
| 2024/0314818 | A1 | * | 9/2024 | Yu | H04W 72/40 |

OTHER PUBLICATIONS

VIVO , "Discussion on mode 2 resource allocation mechanism",
3GPP TSG RAN WG1 #98bis meeting, R1-1910213, Chongqing,
China, Oct. 2019, 13 pages.
OPPO , "FL summary for AL 8.11.2.1—resource allocation for
power saving", 3GPP TSG RAN WG1 #103-e, R1-2009584, e-Meet-
ing [retrieved Aug. 8, 2023]. Retrieved from the Internet <https://
www.3gpp.org/ftp/tsg_ran/WG1_RL1/TSGR1_103-e/Docs>., Oct.
2020, 64 Pages.
PCT/CN2020/140240 , "International Preliminary Report on Pat-
entability", PCT Application No. PCT/CN2020/140240, Jul. 13,
2023, 6 pages.
PCT/CN2020/140240 , "International Search Report and Written
Opinion", PCT Application No. PCT/CN2020/140240, Sep. 28,
2021, 8 pages.

* cited by examiner

<u>100</u>

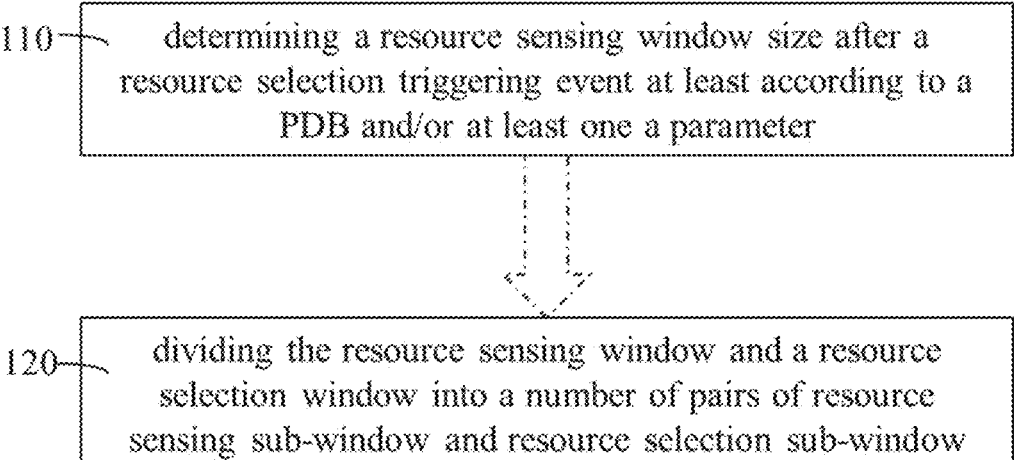

110 — determining a resource sensing window size after a resource selection triggering event at least according to a PDB and/or at least one a parameter 120 — dividing the resource sensing window and a resource selection window into a number of pairs of resource sensing sub-window and resource selection sub-window

Figure 1

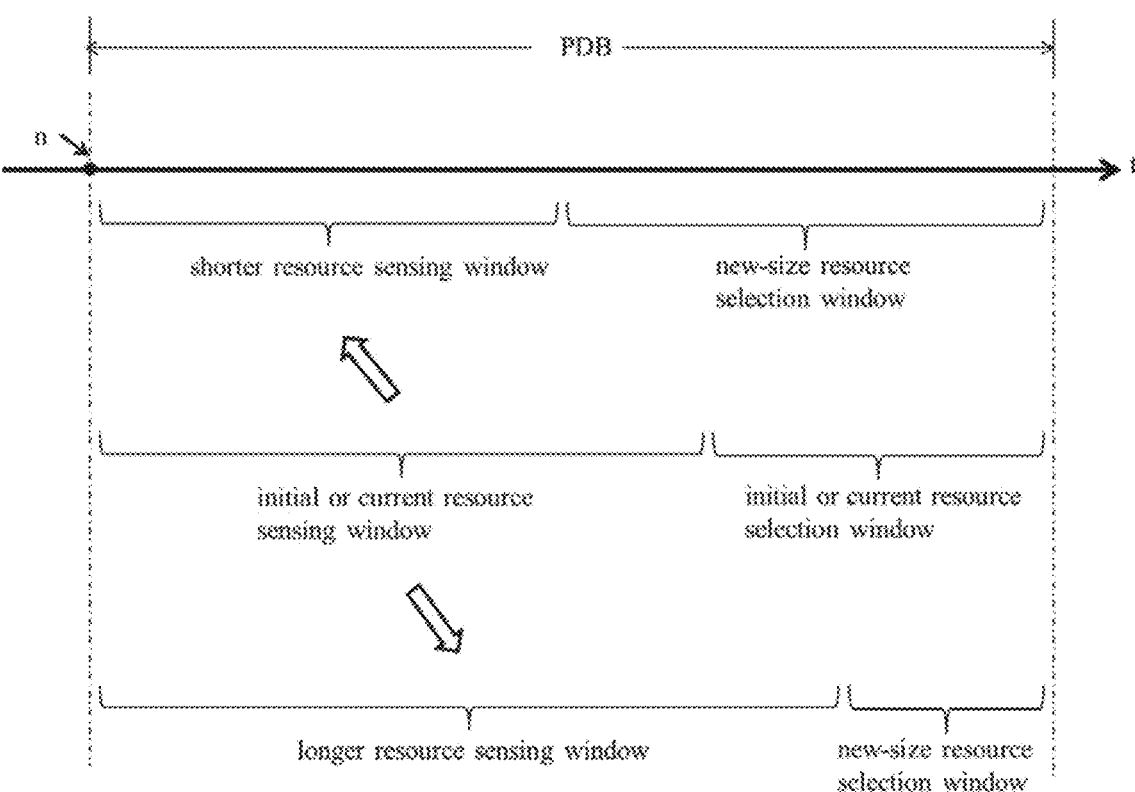

PDB

0 t shorter resource sensing window new-size resource selection window initial or current resource sensing window initial or current resource selection window longer resource sensing window new-size resource selection window

METHODS AND APPARATUSES FOR SENSING RESOURCE FOR SIDELINK TRANSMISSION

TECHNICAL FIELD

The present disclosure relates to methods and apparatuses for sensing resource for sidelink (SL) transmission.

BACKGROUND OF THE INVENTION

For a sensing-based resource selection and SL transmission, a user equipment (UE) autonomously performs a sensing procedure within a resource sensing window and a resource selection procedure within a resource selection window.

The sensing procedure is for sensing resources in the physical layer, within a (pre-)configured resource pool, which are not in use by other UEs with higher-priority traffic and with low interference; and the selecting procedure is for selecting and reserving an appropriate amount of such resources for SL transmission(s). The UE can transmit and re-transmit in the selected and reserved resources a certain number of times until a cause of resource reselection is triggered.

SUMMARY

In some embodiments, a method performed by a UE includes determining a resource sensing window size of a resource sensing window after a resource selection triggering event at least according to a packet delay budget (PDB) and/or at least one parameter for performing sensing-based resource selection and SL transmission and/or dividing the resource sensing window and a resource selection window into a number of pairs of resource sensing sub-window and resource selection sub-window for performing sensing-based resource selection and SL transmission.

In some embodiments, a sum of the resource sensing window size and a resource selection window size of the resource selection window is shorter than or equal to the PDB.

In some embodiments, the method further includes setting the resource sensing window size to be equal to a maximum traffic reservation period value, and the sum of the resource sensing window size and the resource selection window size is less than or equal to the PDB.

In some embodiments, the resource selection window size of the resource selection window is a fixed value configured per resource pool by another UE or a network at least based on the PDB or is predefined per resource pool at least based on the PDB.

In some embodiments, the method further includes setting an initial value for the resource sensing window size, wherein the initial value is configured per resource pool by another UE or a network at least based on the PDB or is predefined per resource pool at least based on the PDB.

In some embodiments, the SL transmission is hybrid automatic repeat request based (HARQ-based), the at least one parameter includes a detected discontinuous transmission (DTX) state, and determining the resource sensing window size further includes increasing the resource sensing window size by an amount from a current value in response to that the number of the detected DTX states, or the number of the detected DTX states within a time duration, or a ratio of the number of the detected DTX states to a total number of transmissions on physical sidelink shared channel (PSSCH) within the time duration increases, and determining the resource sensing window size further includes decreasing the resource sensing window size by the amount from the current value in response to that the number of the detected DTX states or the number of the detected DTX states within the time duration, or the ratio of the number of the detected DTX states to the total number of transmissions on PSSCH within the time duration decreases, herein, the time duration and the amount are configured per resource pool by another UE or a network at least based on the PDB or are predefined per resource pool at least based on the PDB.

In some embodiments, determining the resource sensing window size further includes increasing the resource sensing window size by an amount from a current value in response to that the number of the detected DTX states, or the number of the detected DTX states within a time duration, or a ratio of the number of the detected DTX states to a total number of transmissions on PSSCH within the time duration is higher than a DTX related threshold, and decreasing the resource sensing window size by the amount from the current value in response to that the number of the detected DTX states or the number of the detected DTX states within the time duration, or the ratio of the number of the detected DTX states to the total number of transmissions on PSSCH within the time duration is lower than the DTX related threshold, herein the DTX related threshold is configured per resource pool by another UE or a network or is predefined per resource pool.

In some embodiments, the SL transmission is HARQ-based, the at least one parameter includes a detected acknowledgement (ACK) states, and determining the resource sensing window size further includes increasing the resource sensing window size by an amount from an current value in response to that a number of the detected ACK states, or the number of the detected ACK states within a time duration, or a ratio of the number of the detected ACK states to a total number of transmissions on PSSCH within the time duration decreases, and decreasing the resource sensing window size by the amount from the current value in response to that the number of the detected ACK states, or the number of the detected ACK states Within the time duration, or the ratio of the number of the detected ACK states to the total number of transmissions on PSSCH within the time duration increases, herein, the time duration and the amount are configured per resource pool by another UE or a network at least based on the PDB or are predefined per resource pool at least based on the PDB In some embodiments, determining the resource sensing window size further includes increasing the resource sensing window size by an amount from an current value in response to that a number of the detected ACK states, or the number of the detected ACK states within a time duration, or a ratio of the number of the detected ACK states to a total number of transmissions on PSSCH within the time duration is lower than a ACK related threshold, and decreasing the resource sensing window size by the amount from the current value in response to that the number of the detected ACK states, or the number of the detected ACK states within the time duration, or the ratio of the number of the detected ACK states to the total number of transmissions on PSSCH within the time duration is higher than the ACK related threshold, herein the ACK related threshold is configured per resource pool by another UE or a network or is predefined per resource.

In some embodiments, the at least one parameter includes a measured congestion ratio (CR), and determining the resource sensing window further includes increasing the resource sensing window size by an amount from a current value in response to that the measured CR increases, and decreasing the resource sensing window size by the amount from the current value in response to that the CR decreases, herein, the amount is configured per resource pool by another UE or a network at least based on the PDB or is predefined per resource pool at least based on the PDB.

In some embodiments, determining the resource sensing window further includes increasing the resource sensing window size by an amount from a current value in response to that the measured CR is higher than a CR threshold, and decreasing the resource sensing window size by the amount from the current value in response to that the CR is lower than the CR threshold, herein the CR threshold is configured per resource pool by another UE or a network or is pre-defined per resource pool.

In some embodiments, the at least one parameter includes a measured channel busy ratio (CBR), and determining the resource sensing window further includes increasing the resource sensing window size by an amount from a current value in response to that the measured CBR increases, and decreasing the resource sensing window size by the amount from the current value in response to that the CBR decreases, herein, the amount is configured by another UE or a network at least based on the PDB or is predefined per resource pool at least based on the PDB, herein, the amount is configured per resource pool by another UE or a network at least based on the PDB or is predefined per resource pool at least based on the PDB.

In some embodiments, determining the resource sensing window further includes increasing the resource sensing window size by an amount from a current value in response to that the measured CBR is higher than a CBR threshold, and decreasing the resource sensing window size by the amount from the current value in response to that the CBR is lower than the CBR threshold, herein, the CBR threshold is configured per resource pool by another UE or a network or is predefined per resource pool.

In some embodiments, the method further includes determining the current value of the resource sensing window size to be the maximum traffic reservation period value in response to that the current value is greater than the maximum traffic reservation period value.

In some embodiments, the method further includes determining the current value of the resource sensing window size to be the maximum traffic reservation period value in response to that the current value is less than the maximum traffic reservation period value.

In some embodiments, in response to that the resource sensing window and the resource selection window are divided into a number of pairs of resource sensing sub-window and resource selection sub-window, if a ratio of candidate resources in a preceding resource selection sub-window to a sum of total resources in a resource pool exceeds a resource threshold, the method further comprises refraining from using the remaining resource sensing sub-window(s) and resource selection sub-window(s) behind for performing sensing-based resource selection and SL trans-mission, wherein the resource threshold is configured per resource pool by another UE or a network or is predefined per resource pool.

In some embodiments, in response to that the resource sensing window and the resource selection window are divided into the number of pairs of resource sensing sub-window and resource selection sub-window, the method further includes determining a size of each resource sensing sub-window to be the maximum traffic reservation period value, and the number of pairs multiplexed the maximum traffic reservation period value is less than the PDB.

In some embodiments, the number of pairs and/or the resource sensing sub-window size are configured per resource pool by another UE or a network at least based on the PDB or predefined per resource pool at least based on the PDB.

In some embodiments, an apparatus includes a non-transitory computer-readable medium having stored thereon computer-executable instructions, a receiving circuitry, a transmitting circuitry, and a processor coupled to the non-transitory computer-readable medium, the receiving cir-cuitry and the transmitting circuitry, and the computer-executable instructions cause the processor to implement a method according embodiments of the present application.

BRIEF DESCRIPTION OF THE DRAWINGS

Some example embodiments will now be described, by way of non-limiting examples, with reference to the accom-panying drawings.

FIG. 1 illustrates an exemplary method according to some embodiments of the present disclosure.

DETAILED DESCRIPTION

Figure 2B:
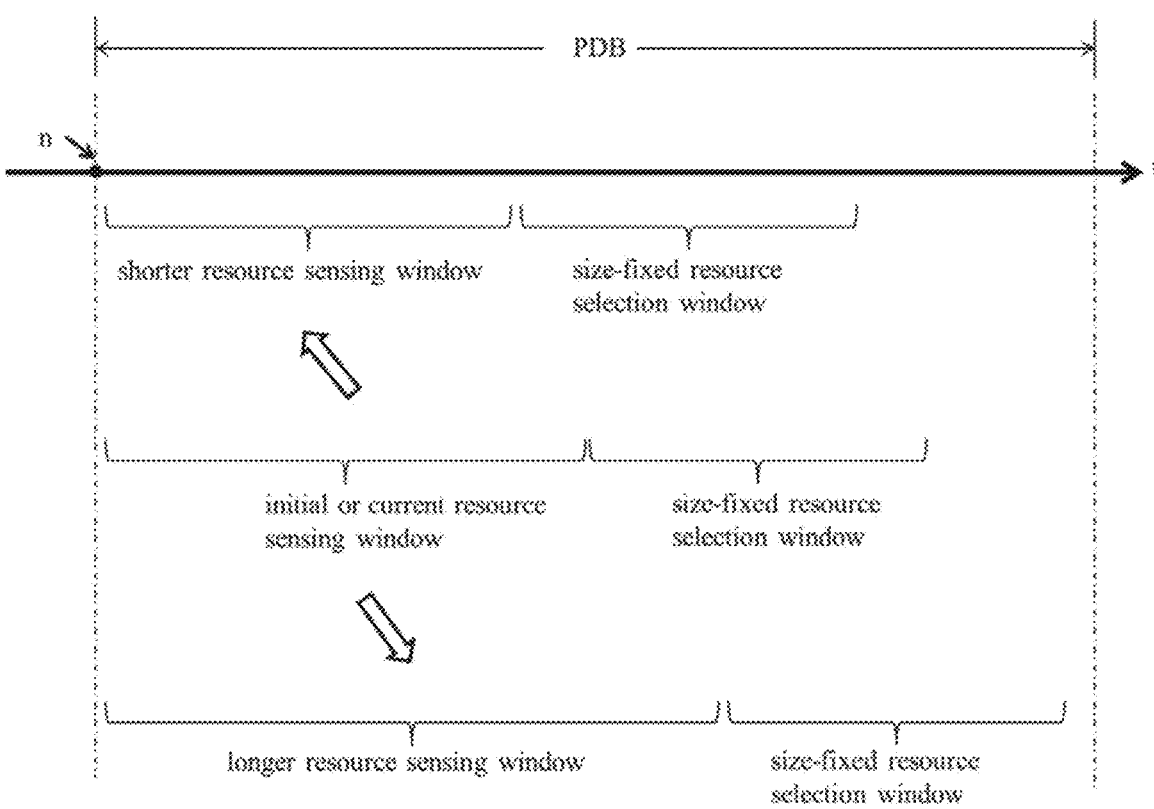
FIG. 2 (including FIGS. 2*a* and 2*b*) illustrates exemplary adjustments of the resource sensing window size and the resource selection window size.

The detailed description of the appended drawings is intended as a description of the preferred embodiments of the present invention, and is not intended to represent the only form in which the present invention may be practiced. It should be understood that the same or equivalent functions may be accomplished by different embodiments that are intended to be encompassed within the spirit and scope of the present invention.

Reference will now be made in detail to some methods, embodiments, and apparatuses of the present disclosure examples of which are illustrated in the accompanying drawings. To facilitate understanding, these methods, embodiments, and apparatuses are provided under specific network architecture and new service scenarios, such as 3GPP 5G and so on. It can be contemplated that along with developments of network architectures and new service scenarios, all embodiments in the present application are also applicable to similar technical problems, and moreover, the terminologies recited in the present application may change, which should not affect the principle of the present application.

The present disclosure relates to sensing resource for SL transmissions. Specifically, the present disclosure relates to adaptive adjustment of a resource sensing window size.

For example, as partial sensing or enhanced sensing mechanism is considered for power sensitive UEs in NR (new radio) SL communication, a power sensitive UE may not perform resource sensing if no traffic needs to be transmitted; and it may perform resource sensing only after a resource selection triggering event. In this way, the sensing window may be defined to be after the resource selection triggering event and before the starting boundary of a resource selection window.

Accordingly, the UE may need to determine the resource sensing window size and the resource selection window size, both of which are after the resource selection triggering event.

Furthermore, based on agreed latency requirement of traffic model for pedestrian to vehicle (P2V) link, i.e., 100 ms, 250 ms, 500 ms, there is no need to sense long time before resource selection window by considering UE power consumption. For example, when the latency requirement is 500 ms, the resource selection window is 100 ms, the sensing window is almost 400 ms (500 ms-100 ms). It consumes too much power for power sensitive UE. Therefore, the UE may consider decreasing the resource sensing window size appropriately.

Moreover, if the total size of the resource sensing window and the resource selection window is fixed based on latency requirement of traffic model, for example 100 ms, the shorter the sensing window, the longer the selection window is. This may increase the resource selection collision.

The present disclosure provides a solution for a UE to adaptively adjust the resource sensing window size and/or divide the resource sensing window and the resource selection window so as to reduce the power consumption and reduce the resource selection collision during SL communication.

FIG. 1 shows an exemplary method 100 performed by a UE according to some embodiments of the present disclosure.

As shown in FIG. 1, the method 100 at least includes an operation 110 and/or an operation 120, The operation 110 illustrates determining a resource sensing window size of a resource sensing window after a resource selection triggering event at least according to a PDB and/or at least one parameter for performing sensing-based resource selection and SL transmission. The operation 120 illustrates dividing the resource sensing window and a resource selection window into a number of pairs of resource sensing sub-window and resource selection sub-window for performing sensing-based resource selection and SL transmission.

In some embodiments, the UE only performs the operation 110.

In some embodiments, the UE only performs the operation 120.

In some embodiments, the UE performs the operation 110 and the operation 120.

In some embodiments, a sum of the resource sensing window size and a resource selection window size of the resource selection window is shorter than or equal to the PDB.

In some embodiments, the operation 110 further includes setting the resource sensing window size to be equal to the maximum traffic reservation period value, and the sum of the resource sensing window size and the resource selection window size is less than or equal to the PDB.

It could be understood that in operation 110, different thresholds correspond to different parameters.

In some embodiments, the method further includes setting an initial value for the resource sensing window size, wherein the initial value is configured per resource pool by another UE or a network at least based on the PDB or is predefined per resource pool at least based on the PDB.

In some embodiments, the initial value for the resource sensing window size is set to be less than or equal to the maximum traffic reservation period value per resource pool.

In some embodiments, the initial value for the resource sensing window size is set to be larger than the maximum traffic reservation period value per resource pool.

In some embodiments, the UE may adaptively adjust the resource sensing size based on the initial value, accordingly, the current value of the resource sensing window size is equal to or different from the initial value.

FIG. 2 (including FIGS. 2a and 2b) illustrates exemplary adjustments of the resource sensing window size in the operation 110. Herein, after the time point (or slot) n when a resource selection triggering event happens, the UE begins to perform resource sensing and selection for SL transmission.

Referring to FIG. 2a, in some embodiments, the resource selection window size equals to the PDB minus the resource sensing window, size; therefore, the adjustment of the resource sensing window size causes the adjustment of the resource selection window size. In other words, when the resource sensing window size is shorter, the resource selection window size is correspondingly longer; while the resource sensing window size is longer, the resource selection window size is correspondingly shorter.

Referring to FIG. 2b, in some embodiments, the window size of the resource selection window is a fixed value configured per resource pool by another UE or a network at least based on the PDB or is predefined per resource pool at least based on the PDB. The sum of these two window size is equal to or less than the PDB. If the resource selection window size is set to be too long, there may be possible resource collision with other UEs. The advantage of a fixed resource selection window size is to reduce this possibility.

Specifically, if a resource reservation indication (for example, due to aperiodic SL traffic, or higher-priority traffic) from other UEs or a network arrives at the UE after the resource sensing window, the UE cannot detect the resource reservation indication. The resource reservation indication indicates that there are some resources are newly reserved by the other UEs; however, if the UE senses these resources in the resource sensing window and treats these resources as available, as the UE cannot detect the resource reservation indication later after the resource sensing window, the UE may still possibly select these resources in the resource sensing window for SL transmission. Therefore, when the UE performs SL transmission on these resources, a potential resource collision with other IEs may happen.

Figure 3:
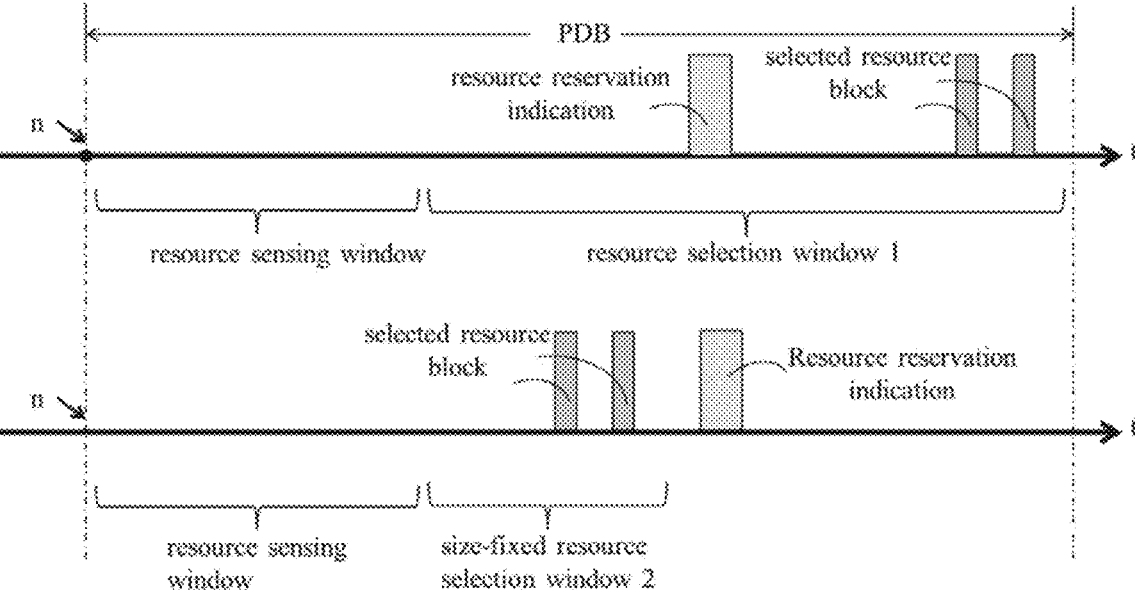
FIG. 3 illustrates an example about avoiding missing reservation indication.

FIG. 3 illustrates an example about a resource reservation indication.

As shown in FIG. 3, the size of the resource selection window t equals the PDB minus the size of the resource sensing window, and it may be too long. In this example, the UE performs SL transmission on the selected resource blocks at the rear end of the resource selection window 1. However, as shown in FIG. 3, there is a resource reservation indication from other UEs or a network arrives at the UE after the resource sensing window while before the SL transmission. As the arriving time of the resource reservation indication is after the resource sensing window, the UE cannot detect this resource reservation indication. If the resources indicated by the resource reservation indication are sensed by the UE in the resource sensing window and are treated to be available, the UE may perform the SL transmission on these resources for SL transmission. If other UEs also select these resources for SL transmission, a resource collision happens.

In contrast, if the UE use the size-fixed resource selection window 2, the UE may perform the SL transmission on the selected resource blocks earlier than the arriving time of the resource reservation indication. Accordingly, a resource collision may be avoided. In addition, in later resource sensing windows, the UE may detect that the resources indicated by the resource reservation indication are reserved by other LEs.

In some embodiments, in the operation 110, the at least one parameter may include a DTX state related parameter, a ACK state related parameter, a measured CR, and/or a measured CBR.

In some embodiments, the SL transmission is HARQ-based, the at least one parameter may include a DTX state related parameter.

In this scenario, the DTX state related parameter may be the number of the detected DTX states, or the number of the detected DTX states within a time duration, or a ratio of the number of the detected DTX states to a total number of transmissions on PSSCH within a time duration. In some embodiments, the time duration is configured per resource pool by another UE or a network at least based on the PDB or is predefined per resource pool at least based on the PDB.

In some embodiments, if the DTX state related parameter increases, the IE may increase the resource sensing window size from the current value by an amount; in some embodiments, if the DTX state related parameter decreases, the UE may decrease the resource sensing window size from the current value by the amount; and it is up to UE implementation. In some embodiments, the amount is configured per resource pool by another UE or a network at least based on the PDB or is predefined per resource pool at least based on the PDB.

In some embodiments, if the DTX state related parameter is higher than a DTX related threshold, the UE may increase the resource sensing window size from a current value by an amount. In some embodiments, if the DTX state related parameter is lower than the DTX related threshold, the UE may decrease the resource sensing window size from the current value by the amount. In some embodiments, the DTX related threshold is configured per resource pool by another UE or a network or is predefined per resource pool.

It could be understood that different types of the DTX state related parameter may correspond to different DTX related threshold values and different values of the amount. For example, if the DTX state related parameter is the number of detected DTX states within a time duration, the corresponding DIX related threshold value is A1, the amount is B1; if the DTX state related parameter is a ratio of the number of the detected DTX states to a total number of transmissions on PSSCH within a time duration, the corresponding DTX related threshold value is A2, the amount is B2. It could be understood that A1 may be different from A2, and B1 may be different from B2.

In some embodiments, the resource sensing window size may be specified by the UE, or another UE, or a network if the value of the DIX state related parameter minus the DTX related threshold is within a certain range, and the amount used to adjust the resource window size is derived from the specification and the initial value.

In some embodiments, the amount used to adjust the resource window size can be a fixed value; i.e., the resource sensing window size is adjusted (shorter or longer) with a fixed value (i.e., the amount).

In some embodiments, the SL transmission is HARQ-based, the at least one parameter may include an ACK state related parameter.

In this scenario, the ACK state related parameter may be the number of the detected ACK states, or the number of the detected ACK states within a time duration, or a ratio of the number of the detected ACK states to a total number of transmissions on PSSCH within a time duration. In some embodiments, the time duration is configured per resource pool by another UE or a network at least based on the PDB or is predefined per resource pool at least based on the PDB.

In some embodiments, if the ACK state related parameter increases, the UE may decrease the resource sensing window size from the current value by an amount; and in some embodiments, if the ACK state related parameter decreases, the UE may increase the resource sensing window size from the current value by the amount; and it is up to UE implementation. In some embodiments, the amount is configured per resource pool by another UE or a network at least based on the PDB or is predefined per resource pool at least based on the PDB.

In some embodiments, if the ACK state related parameter is higher than a ACK related threshold, the UE may decrease the resource sensing window size from a current value by an amount. In some embodiments, if the ACK state related parameter is lower than the ACK related threshold, the UE may increase the resource sensing window size from the current value by the amount. In some embodiments, the DTX related threshold is configured per resource pool by another UE or a network or is predefined per resource pool.

It could be understood that different types of the ACK state related parameter may correspond to different ACK related threshold values and different values of the amount. For example, if the ACK state related parameter is the number of detected ACK states within a time duration, the corresponding ACK related threshold value is C1, the amount is D1; if the ACK state related parameter is a ratio of the number of the detected ACK states to a total number of transmissions on PSSCH within a time duration, the corresponding ACK related threshold value is C2, the amount is D2. It could be understood that C1 may be different from C2, and D1 may be different from D2.

In some embodiments, the resource sensing window size may be specified by the UE, or another UE, or a network if the value of the ACK state related parameter minus the ACK related threshold is within a certain range, and the amount used to adjust the resource window size is derived from the specification and the initial value.

In some embodiments, the amount used to adjust the resource window size can be a fixed value; i.e., the resource sensing window size is adjusted (shorter or longer) with a fixed value (i.e., the amount).

In some embodiments, the at least one parameter may include a measured CR.

In some embodiments, if the measured CR increases, the UE may increase the resource sensing window size by an amount from a current value; in some embodiments, if the measured CR decreases, the UE may decrease the resource sensing window size by the amount from the current value; and it is up to UE implementation. In some embodiments, the amount is configured per resource pool by another UE or a network at least based on the PDB or is predefined per resource pool at least based on the PDB.

In some embodiments, if the measured CR is higher than a CR threshold, the UE may increase the resource sensing window size by an amount from a current value.

In some embodiments, if the measured CR is lower than the CR threshold, the UE may decrease the resource sensing window size by the amount from the current value.

In some embodiments the CR threshold is configured per resource pool by another UE or a network or is predefined per resource pool.

In some embodiments, another UE or a network may specify the resource sensing window size if the value of the measured CR minus the CR threshold is within a certain range, and the amount used to adjust the resource window size is derived from the specification and the initial value.

In some embodiments, the amount used to adjust the resource window size can be a fixed value; i.e., the resource sensing window size is adjusted (shorter or longer) with a fixed value (i.e., the amount).

In some embodiments, the at least one parameter may include a measured CBR.

In some embodiments, if the measured CBR increases, the UE may increase the resource sensing window size by an amount from a current value; in some embodiments, if the measured CBR decreases, the UE may decrease the resource sensing window size by the amount from the current value; and it is up to UE implementation. In some embodiments, the amount is configured per resource pool by another UE or a network at least based on the PDB or is predefined per resource pool at least based on the PDB.

In some embodiments, if the measured CBR is higher than a CBR threshold, the UE may increase the resource sensing window size by an amount from a current value. In some embodiments, if the measured CBR is lower than the CBR threshold, the UE may decrease the resource sensing window size by the amount from the current value. In some embodiments, the CBR threshold is configured per resource pool by another UE or a network or is predefined per resource pool.

In some embodiments, another UE or a network may specify the resource sensing window size if the value of the measured CBR minus the CBR threshold is within a certain range, and the amount used to adjust the resource window size is derived from the specification and the initial value.

In some embodiments, the amount used to adjust the resource window size can be a fixed value; i.e., the resource sensing window size is adjusted (shorter or longer) with a fixed value (i.e., the amount).

In some embodiments, if the current resource sensing window size after an adjustment is greater than the maximum traffic reservation period value per resource pool, the client resource sensing window size is updated to be equal to the maximum traffic reservation period value. This behavior can be based on another UE or network indication/configuration information. The indication/configuration information can be an indicator to enable/disable this behavior.

In some embodiments, if the current resource sensing window size after an adjustment is less than the maximum traffic reservation period value per resource pool, the current resource sensing window size is updated to be equal to the maximum traffic reservation period value. This behavior can be based on another UE or network indication/configuration information. The indication/configuration information can be an indicator to enable/disable this behavior.

In some embodiments, the UE may compare the resource sensing window size with the maximum traffic reservation period value, so as not to increase the resource sensing window size to be greater than the maximum traffic reservation period value.

For example, due to that the measured CR is higher than the CR threshold, the UE plans to increase the current value of the resource sensing window size from 50 ms to 100 ms; however, as the maximum traffic reservation period value is 75 ms, the UE finally increase the current value of the resource sensing window size to 75 ms.

In some embodiments, the UE may compare the resource sensing window size with the maximum traffic reservation period value, so as not to decrease the resource sensing window size to be less than the maximum traffic reservation period value.

For example, due to that the measured CBR is lower than the CR threshold, the UE plans to decrease the current value of the resource sensing window size from 100 ms to 50 ms; however, as the maximum traffic reservation period value is 75 ms, the UE, finally decrease the current value of the resource sensing window size to 75 ms.

In some embodiments, if the current resource sensing window size is equal to the maximum traffic reservation period value, the UE may not increase the resource sensing window size even if the condition of increasing the resource sensing window size is met.

In some embodiments, if the current resource sensing window size is equal to the maximum traffic reservation period value, the UE may not decrease the resource sensing window size even if the condition of decreasing the resource sensing window size is met.

In some embodiments, the UE may adjust the resource sensing window size according to at least one parameter of the DTX related parameter, the ACK related parameter, the measured CR, or the measured CBR. In other words, the UE may adjust the resource sensing window size according to a combination of some parameters of these parameters. This adjustment is up to UE implementation.

In some embodiments, the UE may adjust the resource sensing window size according to at least one other parameter in addition to the DTX related parameter, the ACK related parameter, the measured CR, and/or the measured CBR.

According to the present disclosure, the resource sensing window may be adjusted continuously.

In some embodiments, the UE may perform one resource sensing window size adjustment according to some parameters, and perform another resource sensing window size adjustment according to some other parameters. The parameters for the former adjustment and the parameters for the later adjustment may be partly or fully different.

The aforementioned various methods and implements provide a solution for adaptively adjusting the resource sending window size according to at least one of the parameters (DTX states, ACK states, CR, or CBR) and at least one corresponding threshold. In some embodiments, the resource selection window size is correspondingly adjusted. According to the present disclosure, the resource sensing window size may be adaptively adjusted to reduce the power consumption, while the SL transmission performance is not deteriorated. In addition, in some cases, the resource collision with other UEs may be avoided.

According to the present disclosure, in the operation 120, the resource sensing window and the resource selection window may be divided into a number of pairs of resource sensing sub-windows and resource selection sub-windows. In some embodiments, the number of pairs and/or the resource sensing sub-window size are configured per resource pool by another UE or a network at least based on the PDB or predefined per resource pool at least based on the PDB.

In some embodiments, the size of the resource sensing window (i.e., the total size of all the resource sensing sub-windows) is an initial value configured by another UE or a network at least based on the PDB or predefined per resource pool.

Figure 4:
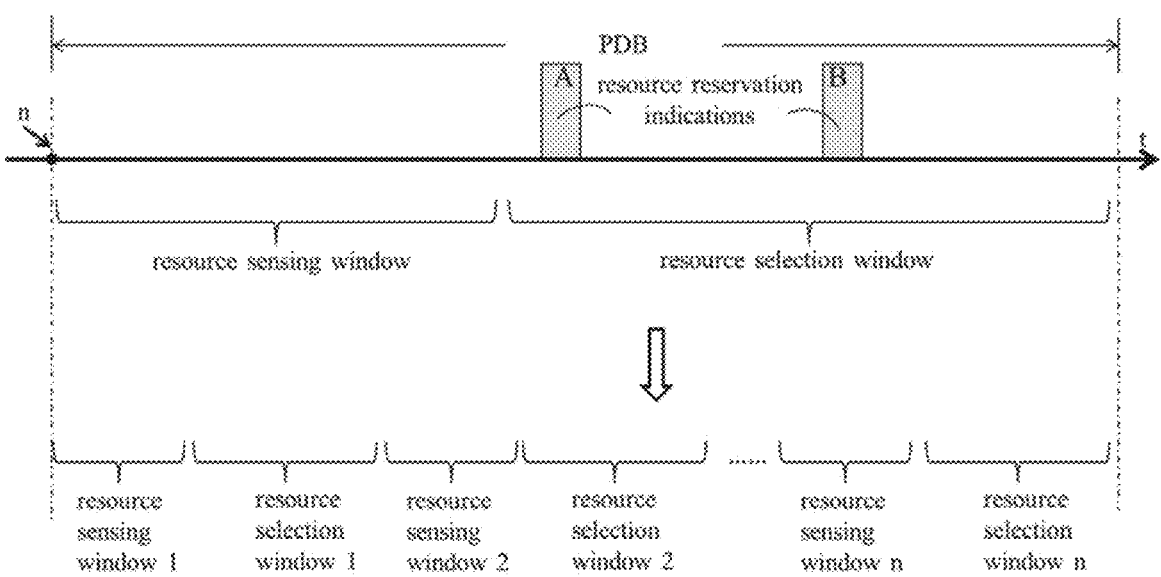
FIG. 4 illustrates an example about divided pairs of resource sensing sub-windows and resource selection sub-windows.

In some embodiments, the size of the resource sensing window (i.e., the total size of all the resource sensing sub-windows) is an adjusted value after performing the operation 110, FIG. 4 illustrates an example about dividing the resource sensing window % and the resource selection window into n pairs of resource sensing sub-window and resource selection sub-window in operation 120, herein n is a positive integer.

One advantage of dividing the resource sensing window and the resource selection window is to avoid possible resource collision due to long resource selection window.

For example, as shown in FIG. 4, two resource reservation indications A and B arrive at the UE after the resource sensing window, thus the UE cannot detect the resource reservation indications. If the UE senses the resources indicated by these resource reservation indications in the resource sensing window and treats these resources available, the UE may select these resources in the resource selection window for SL transmission. This may result in potential resource collisions with other UEs.

If the UE divides the resource sensing window and the resource selection window, as shown in FIG. 4, the resource reservation indication B may be within a resource sensing sub-window n, then the UE may detect it and does not use the resources indicated by the resource reservation indication B for SL transmission.

As shown in FIG. 4, the resource reservation indication A may be within a resource selection sub-window 2. The UE cannot detect the resource reservation indication A during the resource selection sub-window 2; however, the UE may find that the corresponding resources are reserved by other UEs in the later resource sensing sub-windows, e.g., the resource sensing sub-window 3 (not shown in FIG. 4). Therefore, the UE may not use the corresponding resources indicated by the resource reservation indication A in later resource selection sub-windows. Accordingly, the possibility of resource collisions with other UEs can be reduced.

In some embodiments, in operation 120, the UE may not perform resource sensing in at least one resource sensing sub-windows. If a ratio of identified candidate resources (i.e., available resources) in a resource selection sub-window to a sum of total resources in a resource pool is higher than or equal to a resource threshold, the UE may refrain from using the remaining resource sensing sub-window(s) and resource selection sub-window(s) behind for performing sensing-based resource selection and SL transmission that is related with the resource selection triggering event triggering these resource sensing sub-window(s) and resource selection sub-window(s). Herein, the resource threshold is configured per resource pool by another UE or a network or predefined per resource pool. Accordingly, the power consumption may be reduced.

For example, referring to FIG. 4, the UE performs resource selection in the resource selection sub-window 1, if a ratio of the candidate resources in resource selection sub-window 1 to a sum of the total resources in a resource pool is lower than a resource threshold, the UE may not perform SL transmission in resource selection sub-window 1 due to a high possibility of resource collision, while the UE may perform resource sensing in the resource sensing sub-window 2, and perform resource selection in the resource selection sub-window 2.

If a ratio of the candidate resources in resource selection sub-window 2 to a sum of total resources in a resource pool is higher than or equal to the resource threshold, the UE may perform SL transmission in resource selection sub-window 2, and the rest resource sensing sub-window(s) and the rest resource selection sub-window(s) (for example, the resource sensing sub-window 3 and the resource selection sub-window 3 no shown in FIG. 4) are not used for the SL transmission that is related with the resource selection triggering event triggering these resource sensing sub-window(s) and resource selection sub-window(s). The advantage is to reduce power consumption while the SL transmission performance is not deteriorated.

In some embodiments, the UE sets the size of each resource sensing sub-window is equal to the maximum traffic reservation period value, the number of pairs multiplexed the maximum traffic reservation period value is less than the PDB, and the total size of the resource sensing sub-windows and the resource selection sub-windows is less than or equal to the PDB.

The present disclosure provides a solution for a UE to adaptively determine (or adjust) a window size of a resource sensing window according to at least one parameter of the DTX state related parameter, the ACK state related parameter, the measured CR, and/or the measured CBR after a resource selection triggering event. This solution may appropriately reduce the sensing window size while ensuring that the SL transmission can be performed successfully, thereby reducing power consumption. This is very useful for power sensitive UEs.

In addition, the present disclosure also provides a solution for dividing the resource sensing window and the resource selection window into a number of pair of resource sensing sub-window and resource selection sub-window. In some conditions, the UE need not perform sensing-based resource selection and SL transmission in all the resource sensing sub-windows, thereby reducing power consumption; it is very useful for power sensitive UEs. In some conditions, the possibility of resource collisions with other UEs may be reduced.

In some embodiments, these two solutions may be combined.

The spirit of the present disclosure is not limited to the various embodiments, examples, and methods mentioned previously. On the basis of not violating the inventive spirit of the present invention, the above various embodiments in the present invention can be reasonably extended.

For example, the UE may comprehensively consider other parameters in addition to the DTX state related parameters, the ACK state related parameters, the CR, and the CBR for determine or adjust the resource sensing window size.

For example, the UE may perform continuously resource sensing window size adjustments, and different parameters may be used for each adjustment, due to actual requirement and/or actual conditions.

Figure 5:
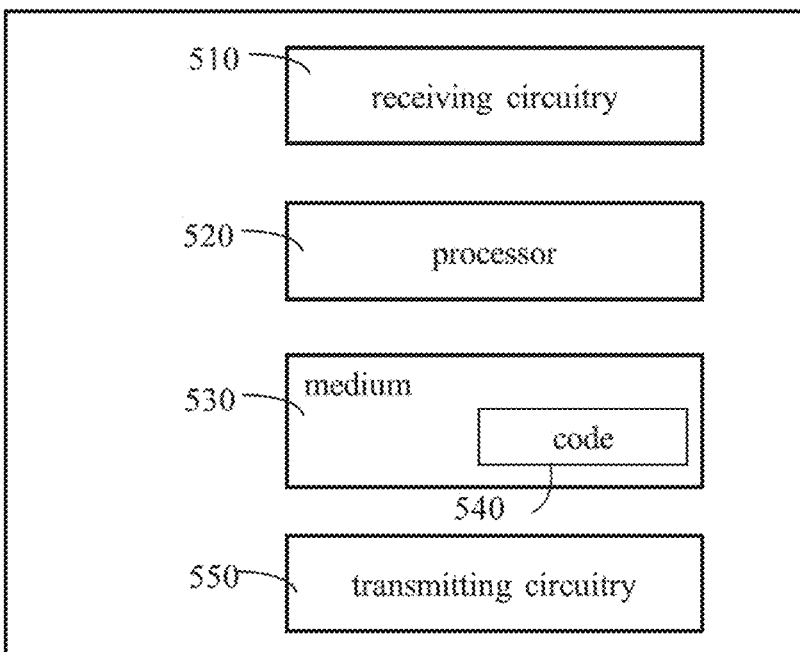
FIG. 5 illustrates an exemplary apparatus according to some embodiments of the present disclosure.

FIG. 5 illustrates an exemplary apparatus 500 for performing the method 100, which, for example, may be at least a part of a UE.

As shown in FIG. 5, the apparatus 500 may include at least one receiving circuitry 510, at least one processor 520, at least one non-transitory computer-readable medium 530 with computer-executable code 540 stored thereon, and at least one transmitting circuitry 550. The at least one medium 530 and the computer computer-executable code 540 may be configured to, with the at least one processor 520, cause the apparatus 500 at least to perform at least the example method 100 described above, wherein, for example, the apparatus 500 may be the UE in the example method 100.

In various example embodiments, the at least one processor 520 may include, but not limited to, at least one hardware processor, including at least one microprocessor such as a CPU, a portion of at least one hardware processor, and any other suitable dedicated processor such as those developed based on for example Field Programmable Gate Array (FPGA) and Application Specific Integrated Circuit (ASIC). Further, the at least one processor 520 may also include at least one other circuitry or element not shown in FIG. 5.

In various example embodiments, the at least one non-transitory computer-readable medium 530 may include at least one storage medium in various forms, such as a volatile memory and/or a non-volatile memory. The volatile memory may include, but not limited to, for example, an RAM, a cache, and so on. The non-volatile memory may include, but not limited to, for example, an ROM, a hard disk, a flash memory, and so on. Further the at least one non-transitory computer-readable medium 530 may include, but are not limited to, an electric, a magnetic, an optical, an electro-magnetic, an infrared, or a semiconductor system, apparatus, or device or any combination of the above.

Further, in various example embodiments, the exemplary apparatus 500 may also include at least one other circuitry, element, and interface, for example antenna element, and the like.

In various example embodiments, the circuitries, parts, elements, and interfaces in the exemplary apparatus 500, including the at least one processor 520 and the at least one non-transitory computer-readable medium 530, may be coupled together via any suitable connections including, but not limited to, buses, crossbars, wiring and/or wireless lines, in any suitable ways, for example electrically magnetically, optically, electromagnetically, and the like.

The methods of the present disclosure can be implemented on a programmed processor. However, controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A method performed by a user equipment (UE), the method comprising:

determining a resource sensing window size of a resource sensing window after a resource selection triggering event based at least in part on at least one of a packet delay budget (PDB) or at least one parameter for performing sensing-based resource selection and side-link (SL) transmission;

determining a resource sensing sub-window size to be equal to a maximum value of a traffic reservation period; and dividing, according to the resource sensing sub-window size, the resource sensing window and a resource selection window into a plurality of pairs of resource sensing sub-windows and resource selection sub-windows for performing the sensing-based resource selection and SL transmission, wherein a quantity of the plurality of pairs multiplexed in the maximum value is less than the PDB.

2. The method of claim 1, wherein a sum of the resource sensing window size and a resource selection window size of the resource selection window is less than or equal to the PDB.

3. The method of claim 1, wherein a resource selection window size of the resource selection window is a fixed value configured per resource pool by another UE or a network based at least in part on the PDB, or is predefined per resource pool based at least in part on the PDB.

4. The method of claim 1, further comprising setting an initial value for the resource sensing window size, wherein the initial value is configured per resource pool by another UE or a network based at least in part on the PDB, or is predefined per resource pool based at least in part on the PDB.

5. The method of claim 1, wherein:

the SL transmission is hybrid automatic repeat request based (HARQ-based), the at least one parameter includes a detected discontinuous transmission (DTX) state-related parameter, and determining the resource sensing window size further comprises:

increasing the resource sensing window size by an amount in response to an increase in a value of the detected DTX state-related parameter; and decreasing the resource sensing window size by the amount in response to a decrease in the value of the detected DTX state-related parameter, wherein the amount is configured per resource pool by another UE or a network based at least in part on the PDB or is predefined per resource pool based at least in part on the PDB.

6. The method of claim 5, wherein the detected DTX state-related parameter is a quantity of detected DTX states, or a quantity of the detected DTX states within a time duration, or a ratio of the quantity of detected DTX states to a total quantity of transmissions on a physical sidelink shared channel (PSSCH) within the time duration.

7. The method of claim 1, wherein:

the SL transmission is hybrid automatic repeat request based (HARQ-based), the at least one parameter includes a detected acknowledgement (ACK) state-related parameter, and determining the resource sensing window size further comprises:

increasing the resource sensing window size by an amount in response to a decrease in a value of the detected ACK state-related parameter; and decreasing the resource sensing window size by the amount in response to an increase in the value of the detected ACK state-related parameter, wherein the amount is configured per resource pool by another UE or a network based at least in part on the PDB or is predefined per resource pool based at least in part on the PDB.

8. The method of claim 7, wherein the detected ACK state-related parameter is a quantity of detected ACK states, or a quantity of the detected ACK states within a time duration, or a ratio of the quantity of detected ACK states to a total quantity of transmissions on a physical sidelink shared channel (PSSCH) within the time duration.

9. A user equipment (UE) for wireless communication, comprising:

at least one memory; and at least one processor coupled to the at least one memory and configured to cause the UE to:

determine a resource sensing window size of a resource sensing window after a resource selection triggering event based at least in part on at least one of a packet delay budget (PDB) or at least one parameter for performing sensing-based resource selection and sidelink (SL) transmission;

divide the resource sensing window and a resource selection window into a plurality of pairs of resource sensing sub-windows and resource selection sub-windows for performing the sensing-based resource selection and SL transmission; and in response to a ratio of a quantity of candidate resources in a preceding resource selection sub-window to a sum of total resources in a resource pool exceeding a resource threshold, refrain from using one or more remaining resource sensing sub-windows and one or more remaining resource selection sub-windows for performing the sensing-based resource selection and SL transmission, wherein the resource threshold is configured per resource pool by another UE or a network node or is predefined per resource pool.

10. The UE of claim 9, wherein the at least one processor is configured to cause the UE to set the resource sensing window size to be equal to a value of a maximum traffic reservation period, and wherein a sum of the resource sensing window size and a resource selection window size of the resource selection window is less than or equal to the PDB.

11. The UE of claim 9, wherein a resource selection window size of the resource selection window is a fixed value configured per resource pool by another UE or a network based at least in part on the PDB, or is predefined per resource pool based at least in part on the PDB.

12. The UE of claim 9, wherein:

the SL transmission is hybrid automatic repeat request based (HARQ-based), the at least one parameter includes a detected discontinuous transmission (DTX) state-related parameter, and to determine the resource sensing window size, the at least one processor is further configured to cause the UE to:

increase the resource sensing window size by an amount in response to an increase in a value of the detected DTX state-related parameter; and decrease the resource sensing window size by the amount in response to a decrease in the value of the detected DTX state-related parameter, wherein the amount is configured per resource pool by another UE or a network based at least in part on the PDB or is predefined per resource pool based at least in part on the PDB.

13. The UE of claim 12, wherein, to determine the resource sensing window size, the at least one processor is further configured to cause the UE to:

increase the resource sensing window size by the amount in response to the value of the detected DTX state-related parameter being greater than a DTX-related threshold; and decrease the resource sensing window size by the amount in response to the value of the detected DTX state-related parameter being less than the DTX-related threshold, wherein the DTX-related threshold is configured per resource pool by another UE or a network or is predefined per resource pool.

14. The UE of claim 9, wherein:

the SL transmission is hybrid automatic repeat request based (HARQ-based), the at least one parameter includes a detected acknowledgement (ACK) state-related parameter, and to determine the resource sensing window size, the at least one processor is further configured to cause the UE to:

increase the resource sensing window size by an amount in response to a decrease in a value of the detected ACK state-related parameter; and decreasing the resource sensing window size by the amount in response to an increase in the value of the detected ACK state-related parameter, wherein the amount is configured per resource pool by another UE or a network based at least in part on the PDB or is predefined per resource pool based at least in part on the PDB.

15. The UE of claim 14, wherein, to determine the resource sensing window size, the at least one processor is further configured to cause the UE to:

increase the resource sensing window size by the amount in response to the value of the detected ACK state-related parameter being less than an ACK-related threshold; and decrease the resource sensing window size by the amount in response to the the value of the detected ACK state-related parameter being greater than the ACK-related threshold, wherein the ACK-related threshold is configured per resource pool by another UE or a network or is predefined per resource pool.

16. The UE of claim 9, wherein the at least one parameter includes a measured congestion ratio (CR), and wherein, to determine the resource sensing window size, the at least one processor is further configured to cause the UE to:

increase the resource sensing window size by an amount in response to the measured CR increasing; and decrease the resource sensing window size by the amount in response to the CR decreasing, wherein the amount is configured per resource pool by another UE or a network based at least in part on the PDB or is predefined per resource pool based at least in part on the PDB.

17. The UE of claim 9, wherein the at least one parameter includes a measured channel busy ratio (CBR), and wherein, to determine the resource sensing window size, the at least one processor is further configured to cause the UE to:

increase the resource sensing window size by an amount in response to the measured CBR increasing; and decrease the resource sensing window size by the amount in response to the CBR decreasing, wherein the amount is configured per resource pool by another UE or a network based at least in part on the PDB or is predefined per resource pool based at least in part on the PDB.

18. The UE of claim 17, wherein, to determine the resource sensing window size, the at least one processor is further configured to cause the UE to:

increase the resource sensing window size by the amount in response to the measured CBR being greater than a CBR threshold; and decreasing the resource sensing window size by the amount in response to the CBR being less than the CBR threshold, wherein the CBR threshold is configured per resource pool by another UE or a network or is predefined per resource pool.

19. A user equipment (UE) for wireless communication, comprising:

at least one memory; and at least one processor coupled to the at least one memory and configured to cause the UE to:

determine a resource sensing window size of a resource sensing window after a resource selection triggering event based at least in part on at least one of a packet delay budget (PDB) or at least one parameter for performing sensing-based resource selection and sidelink (SL) transmission;

determine a resource sensing sub-window size to be equal to a maximum value of a traffic reservation period; and divide the resource sensing window and a resource selection window into a plurality of pairs of resource sensing sub-windows and resource selection sub-windows for performing the sensing-based resource selection and SL transmission, wherein a quantity of the plurality of pairs multiplexed in the maximum value is less than the PDB.

20. A method performed by a user equipment (UE), the method comprising:

determining a resource sensing window size of a resource sensing window after a resource selection triggering event based at least in part on at least one of a packet delay budget (PDB) or at least one parameter for performing sensing-based resource selection and side-link (SL) transmission;

dividing the resource sensing window and a resource selection window into a plurality of pairs of resource sensing sub-windows and resource selection sub-windows for performing the sensing-based resource selection and SL transmission; and in response to a ratio of a quantity of candidate resources in a preceding resource selection sub-window to a sum of total resources in a resource pool exceeding a resource threshold, refraining from using one or more remaining resource sensing sub-windows and one or more remaining resource selection sub-windows for performing the sensing-based resource selection and SL transmission, wherein the resource threshold is configured per resource pool by another UE or a network node or is predefined per resource pool.

* * * * *